United States Patent
Hoegele et al.

(10) Patent No.: US 10,852,126 B2
(45) Date of Patent: Dec. 1, 2020

(54) METHOD AND ARRANGEMENT FOR OPTICALLY CAPTURING AN OBJECT WITH A LIGHT PATTERN PROJECTION

(71) Applicant: Carl Zeiss Industrielle Messtechnik GmbH, Oberkochen (DE)

(72) Inventors: Wolfgang Hoegele, Rosenheim (DE); Christian Hoerr, Flintsbach am Inn (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 16/517,480

(22) Filed: Jul. 19, 2019

(65) Prior Publication Data

US 2020/0025557 A1 Jan. 23, 2020

(30) Foreign Application Priority Data

Jul. 19, 2018 (DE) ........................ 10 2018 212 104

(51) Int. Cl.
*G01B 11/25* (2006.01)
*G06T 7/521* (2017.01)
*G06T 7/55* (2017.01)

(52) U.S. Cl.
CPC .............. *G01B 11/25* (2013.01); *G06T 7/521* (2017.01); *G06T 7/55* (2017.01);
(Continued)

(58) Field of Classification Search
None
See application file for complete search history.

(56) References Cited

U.S. PATENT DOCUMENTS

| 7,440,590 B1 | 10/2008 | Hassebrook et al. |
| 8,224,064 B1 | 7/2012 | Hassebrook et al. |

(Continued)

FOREIGN PATENT DOCUMENTS

| DE | 102013114687 A1 | 6/2015 |
| EP | 1875163 B1 | 6/2014 |

OTHER PUBLICATIONS

Guan et al., "Composite Structured Light Pattern for Three Dimensional Video", Optics Express 11:5, pp. 406-417, 2008.*
(Continued)

*Primary Examiner* — Edemio Navas, Jr.
(74) *Attorney, Agent, or Firm* — Falk Ewers; Ewers IP Law PLLC

(57) ABSTRACT

A method and an arrangement for optically capturing an object with a light pattern projection are provided. The method includes projecting a predetermined number of light patterns on the object, capturing at least one image of the object when each of a respective light pattern is projected to obtain position location dependent image intensity values for a respective projected light pattern, determining a linear combination of the predetermined number of light patterns, and generating a synthesized image intensity value for at least one image location in the image plane which corresponds to an area of the local region. The synthesized image intensity value at the image location is determined by a linear combination of the image intensity values which includes the linear combination of the projection intensity values for the local region, and the projection intensity values are replaced by the image intensity values at the image location.

14 Claims, 4 Drawing Sheets

(52) U.S. Cl.
CPC ............... *G06T 2207/10028* (2013.01); *G06T 2207/10152* (2013.01); *G06T 2207/20221* (2013.01)

(56) References Cited

U.S. PATENT DOCUMENTS

| | | |
|---|---|---|
| 8,462,207 B2 * | 6/2013 | Garcia ................. G01B 11/254 348/135 |
| 8,811,767 B2 | 8/2014 | Veeraraghavan et al. |
| 2006/0210145 A1 | 9/2006 | Lee et al. |
| 2010/0008588 A1 | 1/2010 | Feldkhun et al. |
| 2016/0364872 A1 | 12/2016 | Nakajima |

OTHER PUBLICATIONS

Gupta et al., "A practical approach to 3D Scanning in the Presence of Interreflections, Subsurface Scattering and Defocus", International Journal of Computer Vision 102(1-3), (Mar. 2013).

* cited by examiner

METHOD AND ARRANGEMENT FOR OPTICALLY CAPTURING AN OBJECT WITH A LIGHT PATTERN PROJECTION

CROSS REFERENCE TO RELATED APPLICATIONS

This application claims priority to German patent application DE 10 2018 212 104.4, filed Jul. 19, 2019, the entire content of which is incorporated herein by reference.

TECHNICAL FIELD

The disclosure relates to the field of optical object capture. In particular, the disclosure relates to object capturing, for example to determine depth information by triangulation and/or to determine three-dimensional coordinates of the object surface. The disclosure provides a method and arrangement for optically capturing an object with a light pattern projection and, in particular, with a number of light patterns projected onto the object.

BACKGROUND

It is known to capture the three-dimensional coordinates of object surfaces by triangulation. In particular, solutions are known in which light patterns are projected onto the object surface and an image of the object surface, and specifically of the light pattern, which has been distorted on or by the object surface, is captured with a capture device (for example, with a camera). Expressed differently, the light pattern is captured which is reflected by the object surface and, in the case of a non-planar object surface, is at least locally distorted or deformed in relation to its original state. Light in the context of the present disclosure is understood to mean not only electromagnetic radiation in the visible range, but also electromagnetic radiation in other wavelength ranges. By way of example, the light pattern can be a stripe pattern.

Further, the projection of light pattern sequences which includes a succession (i.e., a sequence) of different light patterns is known. Thereupon, the so-called correspondence problem can be solved and depth information items for the object and, more precisely, the object surface can be determined on the basis of the intensity values determined for a defined camera image region (e.g., for a camera pixel) or, expressed differently, on the basis of the locally captured intensity value sequence that is obtained when projecting the light pattern sequence. By way of example, the depth information items may include distance values of the measuring arrangement from the irradiated object surface region. Light pattern sequences that allow such a determination of depth information items can also be referred to as encoding pattern sequences.

For widespread one projector/one camera systems, there typically is an assignment between locations in the projected patterns and locations in the captured images for the purposes of solving the correspondence problem, to be precise, in such a way that these relate to a common object point and/or that there is an ascertainment of which pattern locations are imaged on which camera locations. The same applies to one projector/multiple camera systems (e.g., systems with two cameras), in which, as a rule, the projector need not necessarily be calibrated. Expressed figuratively, the light pattern sequence can define an intensity value sequence, typically individual to each pixel, such that a unique assignment of camera pixels and projector pixels is possible. As an alternative or in addition thereto, there can be a unique assignment of camera pixels and projector pixels by using a priori knowledge about the sensor geometry and/or the system design, for example in order to resolve possible ambiguities existing at the outset. Once this assignment is known, there can be a triangulation to determine the depth information item. Within the scope of the present disclosure, the term camera pixel is used for pixels of any type of a capture device (i.e., within the meaning of a capture device pixel).

As part of triangulation (or, expressed differently, using what is known as intersection), complete three-dimensional (3D) coordinates of the object surface can subsequently be determined from positions of measurement points in a depth dimension of the object surface and in the knowledge of the measurement design (for example the position of a pattern projection unit and/or capture device). Accordingly, a coordinate or coordinate value typically includes an X-, Y-, and a Z-component in a Cartesian coordinate system with the coordinate axes X, Y, and Z. The Z-component can also be referred to as a depth information item, whereas the X- and Y-components can relate to positions in a plane extending along the object surface, for example. By way of example, the elucidated measurement principle is also explained in DE 10 2013 114 687 A1.

The totality of the coordinate measurement values (or measurement data) obtained in this way can be present in the form of so-called 3D point clouds and can describe, for example, an external form (i.e., a surface) of at least one selected region of the object. In particular, the measurement data can be used to determine the dimensions and geometric sizes (such as diameter or width), to compare the results with specifications and to assess them, to calculate properties of the object (for example quality parameters), and/or to generate a three-dimensional graphic representation of the object.

The measurement duration may be relevant for practical applications, the former specifying the duration required for the optical capture of the object, i.e., for the projection and capture of the light patterns and, in particular, a complete light pattern sequence. As a rule, there are conflicting goals that the measurement duration should be as short as possible, but the quality of the measurement results should be as high as possible. The latter often requires relatively long projection and/or capture durations.

Further, the measurement duration may be undesirably increased by virtue of a suitable light pattern sequence needing to be initially determined iteratively for certain measurement conditions. By way of example, this may require the projection of a plurality of light pattern sequences and a subsequent determination of a measurement quality obtainable therewith. If an employed light pattern sequence turns out to be unsuitable, it is first necessary to determine, completely project, capture, and evaluate a new light pattern sequence.

SUMMARY

It is therefore an object of the present disclosure to provide sufficient measurement quality for the optical object capture within an acceptable measurement duration.

The object is achieved by a method and an arrangement for optically capturing an object with a light pattern projection, as described herein. It goes without saying that, unless otherwise provided or evident, the features mentioned in the introductory description may be applied individually or in any desired combination to the solution disclosed herein.

In general, the disclosure provides for a predetermined number of light patterns to be projected onto an object to be measured and for images of the object to be captured (e.g., with a camera) during the projection of a respective light pattern. Subsequently, virtual images (synthesized images) can be generated or, expressed differently, synthesized from the captured images, in particular by combining the image information of the actually captured images. This can be implemented for only individual image intensity values (also referred to as synthesized image intensity values below), for a plurality of image intensity values or for all image intensity values of a synthesized image. The image intensity values each relate to a specific location in the image plane, or are assigned to the latter. The generated synthesized image intensity values can be determined substantially or exclusively by calculation and generated only in part, or not at all, by a direct pattern projection with an object capture carried out in the process.

Further, individual local (image) regions are defined or such individual local (image) regions form the starting point for generating the synthesized image intensity values, desired intensity values (or else intensity distributions) being intended to be generated in said local (image) regions from the actually captured image information items.

According to an aspect of the disclosure, other image information (e.g., in the form of individual or a plurality of synthesized image intensity values) can subsequently be generated or, expressed differently, synthesized on the basis of the actually projected light patterns and image information captured to this end, without light patterns to be projected for the capture of such image information items actually needing to be projected. Thus, the actually captured image information can be used to generate image information for the object that would be capturable when light patterns are projected that deviate from the actually projected light patterns.

By way of example, this can be exploited to the effect of non-projected synthesized images (or synthesized images that would be capturable when projecting non-projected light patterns) being determined using the actually projected light patterns and the images, captured to this end, on the basis of the generated synthesized image intensity values, a higher measurement accuracy being obtainable therewith, for example since these are more accurately evaluable in view of the light conditions, determinable on the basis of the actually captured images, within the measurement scene and/or reflection properties of the object.

The method also allows a spectrum of image intensity values to be synthesized, respectively, for at least one image location and, typically, for a two-dimensional image region, on the basis of the projected light patterns. By way of example, grayscale value-based synthesized image intensity values and/or synthesized images can be generated on the basis of projected binary light patterns.

In addition or as an alternative thereto, a greater number of different (i.e., light pattern-specific) object images can be generated from a certain number of projected light patterns that would be capturable with the actually projected number of light patterns. More precisely, as a result of the fact that, according to the disclosure, additional synthesized image intensity values and, optionally, complete synthesized images, too, can be synthesized from the captured images, it is possible to increase the number of different light pattern-specific object images. Consequently, fewer light patterns can be projected than would actually be required for the ultimately obtained number of different object images. As a result, it is possible to reduce the required measurement duration.

Further advantages emerge from considering local regions for the production of the synthesized image intensity values. This improves the accuracy since it is possible to also take account of mutual influences of adjacent image locations (e.g., adjacent image pixels). In particular, this can take account of the fact that a synthesized image intensity value for an individual image location can be influenced by projected radiation components which, in fact, are directed to other image locations in the surroundings or neighborhood of the considered image location. By way of example, such influencing can be traced back to inaccuracies in the projection and/or camera optical unit and, in particular, to unsharpness caused thereby. However, unsharpness may likewise occur if there is a departure from the focal plane of the projection and/or camera optical unit (due to leaving the depth of field), for example because object points lying outside of this focal plane should be captured. However, the effect of this unsharpness on a captured image and at an individual image location, too, is in turn specific to the object. By way of example, an image intensity value captured for an image location can be influenced by local and, for example, surface-dependent reflection properties of the object in the surroundings of the observed location. According to an aspect of the disclosure, this can be taken into account by defining the local regions for generating a synthesized image intensity value.

Therefore, since the local regions (or neighborhoods) are taken into account, the described procedure differs from the assumption that there is a unique relationship between intensity values projected in the projection and image plane for corresponding locations and image intensity values capturable in the process (i.e., a projected intensity value always results in a uniquely predictable captured image intensity value without neighboring projected radiation components mattering). Synthesized image intensity values that would be generated on the basis of such an assumption would not correspond, or would at least correspond less accurately, to those image intensity values that would in fact be recordable for a given measurement design when projecting a subsequently explained synthesized light pattern. Under certain circumstances, this can lead to errors when determining depth information items. In particular, this can lead to so-called decoding errors if a plurality of synthesized images are generated and evaluated for a synthesized light pattern sequence on the basis of the synthesized image intensity values.

In detail, a method for optically capturing an object by light pattern projection includes:

projecting a predetermined number of light patterns onto the object to be captured, wherein each of the light patterns includes location dependent projection intensity values in a projection plane;

capturing at least one image of the object when projecting each of a respective light pattern such that location dependent image intensity values for a respective projected light pattern are obtained in an image plane;

determining a linear combination of the projected light patterns, which yields a predetermined distribution (or, expressed differently, a predeterminable distribution and, in general, a distribution that is only predetermined or predeterminable subsequently, i.e., after projection and capture) of projection intensity values in a local region of the projection plane, wherein the local region includes an area (e.g., an elementary stripe) of the projection plane containing at least one location (in particular, a subsequently predetermined location, i.e., predetermined after projection and capture) of the projection plane, for example at least one location defined by a single projector pixel; generating a synthesized image intensity value for at least one image location in the image plane which corresponds to the area of the local region of the projection plane, wherein the synthesized image intensity value at the image location is determined by a linear combination of image intensity values of the images of those light patterns whose projection intensity values form the linear combination of the projected light patterns for the local region, and wherein the linear combination of image intensity values includes the linear combination of projection intensity values for the local region with, however, the projection intensity values being replaced by the image intensity values (of the individual images captured for the light patterns of the linear combination) at the image location.

In other words, a synthesized image intensity value can be generated as follows: generating a synthesized image intensity value for at least one image location in the image plane, which corresponds to the area of the projection plane included in the local region, wherein the synthesized image intensity value is generated on the basis of image intensity values combined in accordance with the linear combination, wherein the combined image intensity values are based on image intensity values of the projected light patterns present at this image location or correspond to these image intensity values.

In general, the method can serve to determine depth information items for the object and, in particular, to capture the object at least in its depth dimension, or else in three-dimensional fashion. The object can be, for example, an industrially manufactured workpiece or an assembly.

The predetermined number of light patterns can also be referred to as a base light pattern sequence. In general, the light patterns can be projected as a sequence (i.e., with temporal spacing) onto the object. However, provision can also be made for at least individual light patterns to be projected simultaneously onto the object, typically by light pattern-specific radiation of different wavelengths. By way of example, at least two of the light patterns can be radiated onto the object simultaneously but with different wavelengths or spectrally spaced apart regions (i.e., different colors). This can further reduce the required measurement duration. A capture device can then have a color sensitive embodiment, for example as a color camera, and it can capture the reflected radiation in order to capture individual images for the individual light patterns therefrom. Reference is also made to the light pattern sequence below, which also includes at least individual ones or all of the light patterns can be projected onto the object simultaneously as explained above and not necessarily in succession.

By way of example, the light patterns can be defined and/or be present in the form of an image file, wherein the image file typically contains information items in respect to a distribution of projection intensity values in the projection plane. As an alternative or in addition thereto, a respective light pattern (or else, in general, the content of the projection plane) can be defined by an intensity value matrix or two-dimensional intensity value distribution. Likewise, a light pattern can be generated by a projection slide. A projection slide can generate unchanging light patterns, wherein the light pattern can be defined, for example, by applying differently dark regions on a transparent area of the slide.

The projected light patterns can be stripe light patterns. In addition or as an alternative thereto, the light patterns can be binary (e.g., merely include bright and dark pattern elements, in particular in the form of stripes). In the case of stripe light patterns, these can be described in a manner known per se by way of a sequence of bit values and/or these can be defined as such, particularly if the stripes extend over an entire dimension (e.g., height and/or column length) of the projection plane.

The projected light patterns may also include grayscale values or may be colored. The generated synthesized image intensity value (also referred to as generated image intensity value) can be defined in analogous manner to the intensity values of the projected light patterns, i.e., merely include binary values or grayscale values, or may be colored. The same applies to synthesized images generated on the basis of a plurality of synthesized image intensity values, said synthesized images being explained below. However, provision can also be made for the synthesized image intensity value to be defined differently to the intensity values of the projected light patterns. In particular, synthesized image intensity values and/or synthesized images including grayscale values can be generated on the basis of binary light patterns. Likewise, binary synthesized image intensity values and/or synthesized images can be generated by grayscale value-based light patterns. More particularly, provision can therefore be made for the possible number of states (and/or the type and/or the value spectrum) of the projection intensity values to deviate from or correspond to the synthesized image intensity values.

The projection plane is typically a two-dimensional plane and, for example, a virtual plane. The projection plane may include a plurality of locations whose position within the projection image plane is uniquely describable, e.g., by a coordinate system of the projection image plane. The projection plane can be a plane, or extend within a plane, of a projection device. The plane generates and/or emits the light patterns (e.g., a projection slide or projection array with micromirrors). A location in the projection plane can be referred to as a projector pixel or can correspond to the latter; however, said location may also include, or correspond to, a plurality of projector pixels. The location (or the projector pixel) may relate to the smallest unit for which a projection intensity value can be defined or, expressed differently, be predetermined. Alternatively, a size of the location can be chosen in such a way that the latter contains a smallest projectable pattern element (at least in one dimension of the projection plane). By way of example, this pattern element can be an elementary stripe, as explained below. In general, an elementary stripe relates to a smallest stripe-shaped pattern element that is projectable or can be projected by a projection device (i.e., imageable on the projection plane of the latter and consequently directable on the object).

A location of the projection plane can be considered to be fixed merely along one dimension and/or coordinate axis of the projection plane, at least for determining the linear combination. By way of example, the dimension and/or coordinate axis can extend across and, in particular, orthogonal to a longitudinal direction of the stripes if the projected light patterns are stripe patterns. By contrast, the location can be considered to be not fixed in a further dimension and/or along a further coordinate axis which, in particular, may extend orthogonal to the aforementioned dimension or coordinate axis and/or in the longitudinal direction of possible stripes (i.e., the location may have any vertical and/or line position in the projection plane, for example). Instead, the assumption can be made that the same linear combination as for the considered location applies to all further locations of the projection plane along the further dimension and/or along the further coordinate axis (i.e., for example, the same linear combination applies to all locations of the area and, in particular, to all locations of an elementary stripe). In particular, the linear combination can be determined elementary stripe by elementary stripe, wherein the assumption is made that the same linear combination applies to each location within the elementary stripe. An individual elementary stripe may define an individual area of the projection plane, or may be included in the latter. By contrast, for the purposes of determining an image location corresponding to the area and/or a location contained therein and/or for the purposes of determining, in general, the synthesized image intensity value, the complete coordinates of the location are typically considered (e.g., with reference to all dimensions and/or coordinate axes of the projection plane).

In general, a projection intensity value can specify the magnitude of the intensity which the light pattern should have at a corresponding location in the projection plane or with which the light pattern should be projected and emitted to this location. Within the scope of the present disclosure, the intensity can be understood to mean, in general, a beam flux density of the radiation or of the light.

In general, a light pattern-specific image can be recorded when projecting a light pattern. In other words, a single light pattern-specific (object) image exists for each light pattern since a specific light pattern is always distorted by the object in the same way and captured in the same way in the case of a constant measurement setup. Capturing can be implemented by a suitable capture device, for example by a camera and/or a camera sensor, for example a CCD or CMOS sensor.

The image plane is typically a two-dimensional plane and, for example, a virtual plane. The image plane can be defined by the capture device or it can relate to the latter and, for example, include, or extend in, a capture plane (e.g., a CCD diode array) of a camera sensor. The image plane may include a plurality of locations (e.g., in the form of individual image pixels) whose position within the image plane is uniquely describable, e.g., by a coordinate system of the image plane. As an alternative or in addition thereto, a respective image (or else, in general, the content of the image plane) can be defined by an intensity value matrix or two-dimensional intensity value distribution. The captured images (and in particular the image intensity values thereof) can be stored such that these can be accessed during the further course of the method.

In general, an image intensity value can specify the captured or recorded (light) intensity at the associated location in the image plane (image location).

The predetermined distribution of projection intensity values can be predetermined and/or defined by a synthesized light pattern. The synthesized light pattern can be a light pattern which is not projected in conjunction with the light pattern sequence and, in particular, which is not projected at any other time when the method is carried out. Instead, this can relate to a light pattern defined on the basis of user prescriptions for example, for which an image (also referred to as synthesized image below) or at least one or more synthesized image intensity value(s) should be synthesized on the basis of the actually captured images. The synthesized image or the synthesized image intensity values can be determined by calculation as described below, without an actual projection of the synthesized light pattern and the associated image captures being necessary. In particular, the synthesized light pattern can be a light pattern that is desired for specific object capture and which is particularly suitable. However, it is typical not to project it but only subsequently to determine it. The synthesized light pattern can be defined analogously to the actually projected light patterns (i.e., for example, as an image file, an intensity value matrix and/or a two-dimensional intensity value distribution).

The local region can relate to a region which, in the center, contains the area (in particular in the form of an elementary stripe or else in the form of the at least one location of the area in the projection plane) (i.e., the area may lie in a center of the local region, for example considered transversely to an elementary stripe direction). All other locations in the local region can be referred to as lying in the neighborhood of the area. The distribution of projection intensity values of the synthesized light pattern in the local region can be determined for said synthesized light pattern. An assignment between the local region of the projection plane and the projection intensity value distribution of the synthesized light pattern sought herefor can be implemented by the location or elementary stripe of the area and/or on the basis of the fact that the synthesized light pattern is typically defined in the overarching coordinate system of the projection plane.

In general, the area may include at least one elementary stripe and said area typically includes exactly one elementary stripe. Further, the method can be applied to all areas and/or elementary stripes or local regions, including all areas/elementary stripes of the projection plane, in particular in such a way that linear combinations and, on the basis thereof, synthesized image intensity values for all image locations (corresponding thereto) are determined for all areas, or else at least for those areas for which corresponding image locations exist.

The method may further include determining at least one corresponding image location of the image plane for the area of the projection plane. In other words, a relationship can be determined in respect of the location (image location) of the image plane on which a location, contained in the area, of the projection plane is imaged; this is typically determined for all areas and/or locations in the projection plane, or at least for those which are capturable (referred to below as image-like or capturable in the image) with an (image) capture device, for example in view of a given measurement situation or measurement scene. More precisely, the radiation generated by the projection of the light pattern is reflected by a location, included in the area, of the projection plane to the object surface and, from there, to at least one corresponding image location of the image plane (or else to an area of a plurality of corresponding image locations), provided the correspondingly reflected radiation lies in a capture region of the (image) capture device. Determining this relationship can also be referred to as solving the correspondence problem and this is typically carried out for every given measurement scene (or, expressed differently, for each object to be captured and for each chosen arrangement of the object in a measurement volume) and, typically, carried out for each projected light pattern sequence as well. Here, an associated area of the projection plane can be determined for each image location of the image plane; however, a corresponding image location need not necessarily be determined for each area of the projection plane on account of a possibly spatially restricted capture region of the (image) capture device, although this would likewise be possible in theory.

In general, it can be determined which locations in the image plane correspond to a certain area of the projection plane. Exactly determining which location within the area corresponds to which location in the image plane is not mandatory for the solution presented herein, although this is nevertheless possible. Instead, it may be sufficient to determine the locations in the image plane on which the area of the projection plane (in particular in the form of an elementary stripe) is imaged, without considering individual locations within the area themselves. Then, the same linear combination as determined for that local region which contains the area of the projection plane (e.g., the corresponding elementary stripe), for example, can be applied in each case to the corresponding image locations.

It should be noted, in general, that a location in the projection plane may correspond to a plurality of image locations in the image plane (or vice versa). This may be traced back to different resolutions of the employed projection device and capture device. In particular, the resolution may depend on the number of individual locations in the projection plane and in the image plane, for which individual intensity values are determinable and/or predeterminable. Expressed differently, the resolution may depend on the number (or else density) of projector pixels and image pixels.

According to an aspect of the disclosure, the resolution of the capture device is chosen to be higher than that of the projection device. Consequently, a location in the projection plane is imaged on a plurality of locations, corresponding thereto, in the image plane.

Generally speaking, the linear combination can include forming a sum from weighted (in accordance with individual factors) summands, wherein the weights (or weighting factors) can be any real numbers, positive and negative.

A summation implemented within the scope of the linear combination may be implemented per position or in a location dependent manner. In particular, a corresponding linear combination can be applied to individual locations of the image and/or projection plane, for example for determining intensity values there.

The linear combination can be used to determine which light patterns need to be combined with one another in which way (e.g., subtracted or added, optionally with individual weighting) in order to obtain the predetermined distribution of projection intensity values in the local region. Then, this information can be used to also combine the image intensity values (or modified image intensity values determined on the basis thereof; see bright and dark image subtraction explained below) for precisely these light patterns in analogous fashion and to obtain the synthesized image intensity value therefrom.

Consequently, the linear combination of the image values can be the same linear combination that is determined for the area of the projection plane and consequently the local region as a linear combination of the projected light patterns for obtaining the predetermined projection intensity value distribution, with the difference that the projected light patterns are replaced by the (possibly modified) image intensity values of the captured images at the image location. As explained, this image location may correspond to the area of the projection plane. Here, each projected light pattern is typically replaced by the (possibly modified) image intensity value which belongs to the image recorded during the projection of this light pattern.

The formulation that the combination of the image intensity values has the linear combination of the projection intensity values can be understood to mean that the individual expressions of the projection intensity value linear combination (e.g., the individual summands thereof) are contained in the linear combination of the image intensity values, but modified in accordance with the value replacement. However, the image intensity value linear combination may additionally also include further expressions, for example further summands to generate the modified image intensity values, discussed above and below, for a bright or dark image subtraction.

It should be noted that only the local region can be considered to be within the scope of the linear combination. Expressed differently, it is possible to determine a linear combination with which the predetermined projection intensity value distribution is achievable in the local region in any case. However, the resultant projection intensity value distributions of this linear combination outside of the local region may be irrelevant. In particular, outside of the local region, the resultant projection intensity value distribution of the linear combination may deviate from that of a possible synthesized light pattern.

A possible procedure for implementing the explained principle of the method may include the following measures, with the list below not intending to be understood as a set temporal sequence and not all measures being mandatory:

a) a predetermined sequence of light patterns, which may also be referred to as a base light pattern sequence, is projected onto the object to be captured;

b) at least one image of the object is captured for each projected light pattern such that location dependent image intensity values are obtained in an image plane for a respective projected light pattern;

c) the area including at least one location and/or pixel of this synthesized light pattern which should be considered in the projection plane is determined for a synthesized light pattern, wherein the area can be an elementary stripe, for example, or can include the latter;

d) a local region in the projection plane including the corresponding area of the synthesized light pattern is determined;

e) a predetermined distribution of projection intensity values (e.g., predetermined by the synthesized light pattern) is determined in the local region;

f) a linear combination of the projected light patterns that yields the predetermined distribution of projection intensity values in the local region of the projection plane, and hence in the area, is determined;

g) at least one image location in the image plane corresponding to the area in the projection plane is determined and, in particular, all image locations corresponding to the area in the projection plane are determined (e.g., all image locations corresponding to an elementary stripe in the projection plane); and h) a synthesized image intensity value is generated for the at least one image location in the image plane on the basis of this linear combination.

Steps c) to h) can be repeated as often as desired, in particular until a complete synthesized image has been assembled from synthesized image intensity values (i.e., until a synthesized image intensity value has been determined for each image location). Here, provision can also be made for initially determining (e.g., by step g) the areas for which corresponding image locations even exist. As a result, areas of the projection plane not capturable in terms of images can be excluded from further considerations.

According to an aspect of the method and the arrangement, the light patterns of the projected sequence have such projection intensity values that any distributions of projection intensity values can be generated therefrom in each local region of the projection plane with a linear combination. This allows the projected light patterns to facilitate the synthesis of any synthesized light pattern or the synthesis of synthesized light patterns with any content.

By way of example, a projection plane with a size defined as constant can be assumed, with both the synthesized light patterns and the projected light patterns being defined therein. In this projection plane, every possible projection intensity value distribution can be considered for a region with a defined size (e.g., including a predetermined number of projector pixels). Subsequently, the light patterns to be projected can be defined (manually or iteratively and/or by algorithm) in such a way that, for each corresponding region of the projector plane, each projection intensity value distribution can be generated by a linear combination of the projection intensity values of the projected light patterns. Here, it is understood that the arbitrary projection intensity value distributions typically relate to the intensity value spectrum of the synthesized light pattern and, in general, may be binary or grayscale value-based, for example.

According to a further aspect of the method and the arrangement, provision can be made for depth information items for the object to be determined on the basis of the synthesized image intensity value. As explained, the depth information items may relate to a distance value of a measuring apparatus or arrangement (or, for example, of a capture device or projection device of the arrangement explained below) from the irradiated object surface region and/or may specify the latter. Determining the depth information may assume that further synthesized image intensity values or else a complete synthesized image, or else a sequence of corresponding synthesized images, are also generated in addition to the at least one synthesized image intensity value. Consequently, the depth information items may also be determined only indirectly on the basis of the synthesized image intensity value or, expressed differently, the generated synthesized image intensity value may form a starting point for determining the depth information item.

In general, provision can be made for depth information items not to be generated directly on the basis of the originally projected light patterns and the images captured to this end; i.e., the depth information item can be determined exclusively on the basis of the synthesized image intensity values or synthesized images assembled therefrom. Expressed differently, the synthesized image intensity values or synthesized images can be evaluated for the purposes of determining the depth information item, but not the images captured for the actually projected light patterns.

The solution presented herein allows, very generally, the calculation of a synthesized image sequence from a projected light pattern sequence and allows this in a comparatively short period of time. Further, a restricted number of actually projected light patterns is sufficient to this end, and so the overall procedure duration (pattern projection and calculation of synthesized images) is likewise short.

A development of the arrangement and of the method provides for one of the following variants to apply in respect of the number of light patterns:
  no more than twenty light patterns are projected; and
  no more than fifty light patterns are projected.

In general, a small number of projected light patterns allows the measurement duration to be shortened. On the other hand, if the number of projected light patterns is too low, it may be difficult, or even no longer possible, to assemble desired distributions of projection intensity values (or desired synthesized light patterns) by linear combination. It was found that a satisfactory compromise between required measurement duration and options for generating distributions or synthesized light patterns can be obtained with the aforementioned numbers of light patterns.

According to a further exemplary embodiment of the arrangement and of the method, the size of the local region of the projection plane is chosen depending on a size of an area in the image plane, within which changeable image intensity values are determinable when projecting a predetermined pattern element. By way of example, the local region can be chosen to be identical to the size of this area in the image plane, or else said local region may be chosen in such a way that it does not exceed the size of the latter. This exemplary embodiment is based on the idea explained above that it is by no means readily possible to assume a unique relationship between the intensity values of a projector pixel and of a camera pixel since the intensity value of a camera pixel may also be influenced by adjacent pixels or radiation components.

In general, the predetermined pattern element may have a higher intensity than regions of the pattern adjacent thereto. By way of example, this may relate to a bright pattern element on a dark background. More particularly, a pattern element can be an area component of a light pattern which is variable for the purposes of defining the content of the light pattern (for example, for which defined projection intensity values are predeterminable). By way of example, a pattern element may include at least one field or at least one stripe of the light pattern with a predeterminable color or brightness. In one variant, the light patterns are each defined as a stripe pattern containing a plurality of stripes of differently great or low brightness. Further, the light pattern may be binary although this is not mandatory (i.e., it may include only two different types of pattern elements, for example a number of bright stripes and a number of dark stripes which are distributed within the light pattern in defined fashion).

Further, the predetermined pattern element can be a pattern element with the smallest projectable dimensions, at least along one dimension of the projection plane. The at least one dimension can be a coordinate axis of the projection plane and/or a line or column axis of the projection plane. In the case of stripe patterns, the at least one dimension can extend transversely to the longitudinal axis of the stripes. A considered area of the projection plane may include at least one pattern element and, as mentioned, at least one elementary stripe.

In the case of projected stripe patterns, the smallest projectable pattern element can be the narrowest (or thinnest) possible stripe that is projectable in accordance with the resolution of an employed projection device. Such a stripe can also be referred to as an elementary stripe. In general, the predetermined pattern element may include no more than three, no more than two or no more than one location or projector pixel in at least one dimension (and/or along at least one coordinate axis) of the projection plane.

As an alternative or in addition thereto, provision can be made for the local region to have one of the following properties:
  a size of the local region is chosen in such a way that the latter may include no more than thirty of a predetermined pattern element (in particular at least along a dimension of the projection plane); and
  a size of the local region is chosen in such a way that the latter may include no more than twenty of a predetermined pattern element (in particular at least along a dimension of the projection plane).

In general, the local region (at least in one dimension of the projection plane) can be smaller than a complete line of the projection plane (particularly when elementary stripes extend in the column direction) and/or can include a component of less than 1% of the overall area of the projection plane.

Once again, the predetermined pattern element can be one of the variants discussed above, i.e., in particular, an elementary stripe. The same applies to the at least one dimension of the projection plane which, for example, may relate anew to a coordinate axis that extends across a possible stripe direction. An area of the local region can be chosen in such a way that the latter corresponds to the summed area of a plurality of the predetermined pattern elements along at least one dimension of the projection plane, in particular transversely to the stripe direction.

Consequently, provision can also be made for the local region to include a certain number of projector pixels or locations in the projection plane, and in particular a plurality thereof, at least along the one dimension or coordinate axis. The pixels or locations can be strung together along the dimension or coordinate axis. By way of example, the pixels or locations can each follow one another and/or be adjacent to one another in pairs. In particular, the pixels or locations can immediately follow one another (i.e., without further pixels or locations not belonging to the region lying therebetween).

What generally applies is that the images that would in fact be capturable during a projection of the synthesized light pattern can be approximated more accurately if a larger local region is chosen (for example since more interactions between the intensity values respectively captured therein can be taken into account for a larger local region). On the other hand, it may be difficult or even impossible to still obtain the predetermined projection intensity value distributions for arbitrarily large local regions by linear combination, or else a great number of projected light patterns, accordingly lengthening the measurement duration, would be required to this end.

According to an aspect of the method and the arrangement, provision is made for at least one synthesized image to be generated on the basis of a plurality of generated synthesized image intensity values. In particular, provision can be made for a corresponding synthesized image intensity value to be generated for each image location or each pixel of the synthesized image.

In this context, provision can further be made for a plurality of synthesized images to be generated, with the synthesized images being assembled to form a synthesized image sequence which belongs to a predetermined synthesized light pattern sequence. Expressed differently, the synthesized image sequence can relate to those synthesized images which would be capturable, in theory, when projecting the synthesized light pattern sequence.

In general, the synthesized image sequence can be generated, or defined, on the basis of the synthesized light pattern sequence. The synthesized light pattern sequence may be a predetermined encoding pattern sequence, i.e., a sequence on the basis of which depth information items are determinable for the object since the correspondence problem, for example, can be solved by the sequence. In particular, provision can be made for a projector pixel to be able to be assigned, typically uniquely, to a camera pixel by the coding predetermined by the sequence. By way of example, the synthesized light pattern sequence can be Gray-encoded and/or have a phase shift.

Generating the synthesized image sequence offers the advantage that a suitable encoding or sequence can be set only following the image recording (e.g., on the basis of an accordingly defined sequence of synthesized light patterns and synthesized images generated to this end). By way of example, properties of the object and/or of the measurement scene, such as the object reflection properties or the general light conditions within the measurement scene, for example, can be determined on the basis of the images captured for the actually projected light patterns. On the basis thereof, a suitable encoding pattern sequence can subsequently be generated in the form of the synthesized light pattern sequence, which promises a high measurement accuracy for the determined properties.

As already mentioned above, a plurality of (typically different) synthesized images can be generated, the number of synthesized images being greater than or equal to a number of projected light patterns. This facilitates a reduction in the measurement duration and, at the same time, increases the obtainable accuracy since only a few light patterns have to be projected, captured and evaluated but comprehensive information can be made available on account of the increased number of synthesized images.

According to a further exemplary embodiment of the apparatus and of the method, the projected sequence of light patterns has at least one of the following properties:
the projected sequence of light patterns is Gray-encoded; and
the projected sequence of light patterns includes light patterns with predetermined run-length properties.

Generally, the Gray-encoding can assume that the sequence of projection intensity values for a predetermined location in the projection plane (or a projector pixel) only differs in respect of a pattern element and/or only differs in respect of a coding information item (e.g., in respect of a single bit value) from the corresponding sequence at an adjacent location when considered over the totality of light patterns to be projected. Such a sequence can also be referred to as a codeword for an associated image location. Gray-encoding offers the advantage that a robust coding strategy is provided. If errors arise within the scope of capturing and/or evaluating the images, said errors typically relate only to a single restricted region of the image plane. In particular, what can be achieved with a higher probability when corresponding errors occur within the scope of decoding (i.e., solving the correspondence problem) is that at most one location in the projection plane adjacent to a camera pixel (or an adjacent projector pixel) is incorrectly assigned to said camera pixel instead of the relevant location in the projection plane (or projector pixel), but not a location in the projection plane that is significantly spaced apart therefrom. The latter could lead to decoding or solving the correspondence problem not being successful or being erroneous.

The run-length properties can be predetermined as an admissible maximum and/or as an admissible minimum run-length. In general, the run-length can relate to a prescription about the maximum distance over which a pattern element of the same type extends and/or about the maximum number of pattern elements of the same type that may immediately follow one another. By way of example, this may relate to a predetermined distance or number for a pattern element in the form of (e.g., bright or dark) elementary stripes. In the case of binary light patterns, the pattern element may have a value of 0 or 1, and so the run-length property may relate to the number of successive zeros or ones.

It was found that an accurate (i.e., less erroneous) evaluation of the captured images in the form of an accurate decoding or solution to the correspondence problem can be achieved with a high minimum run-length, for example because larger area regions of the same type (e.g., larger area bright or dark stripes) are present in the captured images. However, an arbitrarily large maximum run-length would make it more difficult to find linear combinations for assembling the predetermined projection intensity value distributions in the local regions. This would, once again, have to be compensated by way of a larger number of projected light patterns, which accordingly increases the measurement duration.

By contrast, a minimum run-length that is as long as possible reduces the risk of individual information items or pattern elements (e.g., stripes) of the light patterns being incorrectly interpreted and/or decoded in the case of low intensities.

Typically, the minimum and maximum run-length can be chosen to be as close as possible to one another. As a result, the projected light patterns can be similar to one another, at least locally, and/or individual regions of a light pattern can be similar to one another (e.g., have a similar distribution and size of pattern elements such as stripes, for example). This offers advantages in respect of possible long-wavelength effects during the projection (e.g., stray light of the objective lenses). These may possibly not be considered to be sufficient by the chosen neighborhood. For such effects, it is helpful if the projected light patterns once again appear very similar when considered globally, despite having local differences, and said projected light patterns consequently generate similar very-long-wavelength intensity offsets when considered globally.

It was found that a suitable compromise can be reached by virtue of a minimum run-length of at least five, eight or ten being selected and/or a maximum run-length of at least twelve, sixteen or twenty being selected, wherein, theoretically, any pair of the aforementioned examples for the minimum and maximum run-lengths can be formed and predetermined together, but wherein the minimum run-length is typically chosen to be as close as possible to the maximum run-length. By way of example, in comparison with the pattern number, the run-lengths can be +/−3 (i.e., maximum run-length equals pattern number +3; minimum run-length equals pattern number −3) or +/−2.

In general, provision can be made for the minimum run-length to be chosen to be as large as possible and the maximum run-length to be chosen to be as close as possible to the minimum run-length, for as long as this still allows a sequence of projected light patterns to be defined, by which arbitrary projection intensity value distributions are producible by linear combination in the local regions of the projection plane.

Typically, the minimum run-length is chosen in such a way that it assumes a smaller or equally sized region within the projection plane than the local regions (or neighborhoods). By contrast, the maximum run-length is typically larger than or the same size as the local regions or neighborhoods.

In a development of the arrangement and of the method, the number M of projected light patterns is chosen depending on the maximum possible number K of pattern elements in a light pattern, in particular in such a way that (at least in the case of binary light patterns) the following applies: $2M \geq K$. In the case of stripe patterns, the pattern elements may relate anew to elementary stripes. What can be achieved particularly reliably hereby is that a unique decoding and hence a unique assignment of (at least the image-like capturable) areas of the projector plane to locations of the image plane is possible.

If non-binary light patterns are used, in which a single pattern element and/or a single location in the projection plane may adopt more than two different states (e.g., p brightness levels with $p>2$), the following pre-condition being satisfied may suffice for obtaining uniqueness: $pM>K$. Consequently, the number of required light patterns within the projected sequence can also be reduced in relation to the binary case.

By way of example, a unique decodability may not be necessary if captured image information items (e.g., captured codewords or intensity value sequences for a single image location) can be assigned to certain regions in the camera image in advance on account of geometric arrangements in the measurement setup. In this case, identical captured codewords, too, can additionally be distinguished from one another on account of their position in the camera image, and so a unique assignment to the relevant image locations is possible.

According to a further aspect of the method and the arrangement, the same sequence of light patterns is projected for measuring workpieces with different geometric properties. In general, provision can be made for the projected sequence of light patterns to be set independently of a workpiece to be measured. Consequently, the arrangement for carrying out the method can be configured to always project the same light pattern sequence, even over a plurality of different objects. Naturally, provision can also be made for changes in the light pattern sequence to be facilitated, but typically in such a way that a plurality of different objects are once again measurable or measured therewith. This offers the advantage of a user not always needing to define a new light pattern sequence; instead, these can be predetermined by a generator of the arrangement used for carrying out the method, for example. In particular, such a light pattern sequence can be set as a standard case, by which arbitrary distributions of projection intensity values can be generated using captured image intensities by linear combination in the way explained above.

According to an aspect of the arrangement and of the method, provision is made for a minimum intensity value to be subtracted from the image intensity values, present at the image location, of the images captured for the projected light patterns and/or for the image intensity values respectively to be subtracted from a maximum intensity value, for the purposes of producing the synthesized image intensity value. For the purposes of such a subtraction, the linear combination of the image intensity values may include additional expressions in relation to the linear combination of the projection intensity values (i.e., have the linear combination of the projection intensity values (modified according to the prescription of the value replacement) but also correspondingly additional expressions). These additional expressions can then also be weighted analogously when weighting the image intensity values. A dark image subtraction or bright image subtraction can be realized hereby. More precisely, the minimum intensity value can be determined from the totality of the image intensity values present at the considered image location over all of the projected light patterns. Subsequently, the latter can be subtracted from all image intensity values present at this image location. In addition or as an alternative thereto, there can also be a bright image subtraction. To this end, a maximum intensity value can be determined from all image intensity values captured at the image location over all of the projected light patterns (in a manner analogous to the minimum intensity value) and the corresponding image intensity values can be subtracted from said maximum intensity value.

The bright and dark image subtraction allows components of the background illumination of the measurement scene, which may lead to so-called intensity offsets, or else other disturbing radiation components, to be compensated at least in part by calculation. However, in particular, this avoids such intensity offsets being summed within the scope of the linear combination, for example, and consequently amplifying an offset effect.

The disclosure also relates to an arrangement for optically measuring an object using a light pattern projection, comprising:

a projection device configured to project a predetermined number of light patterns on the object to be measured, wherein the light patterns each include location dependent projection intensity values in a projection plane;

a capture device configured to capture at least one image of the object in each case when projecting a respective light pattern such that location dependent image intensity values for a respective projected light pattern are obtained in an image plane; and a synthesized image generating device configured to carry out the following:

determining a linear combination of the projected light patterns, which yields a predetermined distribution of projection intensity values in a local region of the projection plane, wherein the local region includes an area of the projection plane containing at least one location of the projection plane (and at least one corresponding image location of the image plane exists for the area); and generating a synthesized image intensity value for at least one image location in the image plane which corresponds to the area of the local region of the projection plane, wherein the synthesized image intensity value at the image location is determined by a linear combination of image intensity values of the images of those light patterns whose projection intensity values form the linear combination of the projected light patterns for the local region, and wherein the linear combination of image intensity values includes the linear combination of projection intensity values for the local region, with, however, the projection intensity values being replaced by the image intensity values at the image location. Alternatively, the generating can also be implemented according to the aforementioned alternative statement.

However, a corresponding synthesized image intensity value is typically determined in the method and the arrangement for each, but at least for a plurality, of the image locations in the image plane; however, on account of the above-explained possibly restricted capture region, this is not necessarily tantamount to corresponding image locations being present for each area of the projection plane. Expressed differently, provision can be made within the scope of the method for only those areas of the projection plane which even have corresponding image locations available to be considered, wherein such areas may also be determined or selected within the scope of a separate method step.

The projection device can be realized as a digital projector, for example including a so-called DMD (digital micromirror device). Alternatively, the projection device can be realized as a projector in which light patterns are producible by projection slides. The capture device may include a photosensitive sensor and/or an imaging unit in general. The capture device can be realized as a camera, in which the captured images are subdivided according to a pixel grid (or a pixel matrix). Further, the capture device may include a CCD or CMOS sensor. The synthesized image production device can be realized as a computer program or as a software module with program instructions which, when executed on a processor, prompt the arrangement to carry out the measures specified in conjunction with the synthesized image production device. The synthesized image production device can be realized in a control device or a central computing device of the arrangement, or else it can be provided by a separate PC or separate computing unit.

The arrangement may include any development and any further feature in order to provide or perform all of the steps, operating states and functions mentioned above or below. In particular, the arrangement may be configured to implement a method according to any of the aspects mentioned above or below.

BRIEF DESCRIPTION OF THE DRAWINGS

The disclosure will now be described with reference to the drawings wherein.

DESCRIPTION OF EXEMPLARY EMBODIMENTS

Exemplary embodiments of the disclosure will be explained below with reference to the accompanying schematic figures. Features that coincide in their nature and/or function may in this case be provided with the same designations throughout the figures.

Figure 1:
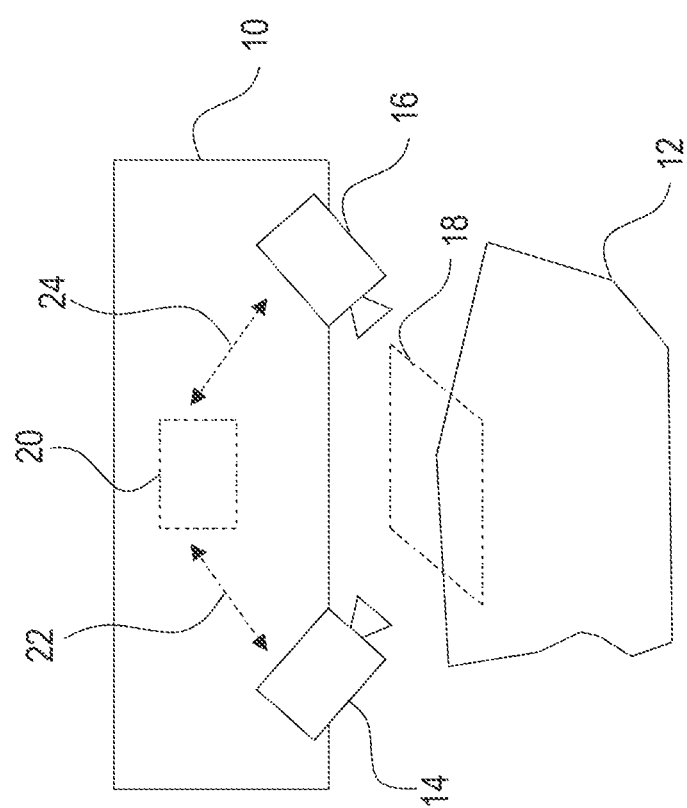
FIG. 1 shows a schematic illustration of an arrangement with which a method is performed according to an exemplary embodiment of the disclosure.

FIG. 1 shows an arrangement 10 according to an exemplary embodiment of the disclosure, which, as a stand-bound arrangement (or apparatus) or as a hand-held device, can be positioned relative to an object 12. The object 12 in the exemplary embodiment shown is a processed workpiece, the depth information items of which is to be determined by the arrangement 10. The obtained depth information items can be complemented to form three-dimensional form information items which can be processed further, for example for checking dimensional accuracy and/or surface quality.

The arrangement 10 includes a capture device 14 in the form of a camera and a projection device 16 in the form of a digital projector, which may include a digital micromirror device (DMD), for example. The capture device 14 and the projection device 16 are directed at a common virtual measurement region 18, which in FIG. 1 is schematically indicated as a dashed measurement field. The measurement region 18 here defines, although this is not specifically shown, a three-dimensional measurement volume in which measurement data can be obtained with an optimum accuracy.

The capture device 14 includes a suitable camera sensor configured to capture light reflected by the object 12. The projector 16 is configured to direct or radiate a plurality of different light patterns onto the object 12, wherein the light patterns are binary stripe light patterns. These light patterns in turn can be captured in the form of reflected light by the capture device 14.

The arrangement 10 further includes a synthesized image generating device 20 in the form of a separate computing unit, the latter including a processor and a storage medium with program instructions for carrying out the method steps explained below when these program instructions are executed on the processor. The synthesized image generating device 20 is connected to the capture device 14 and also to the projection device 16 by schematically illustrated signal paths 22 and 24. Data can be interchanged and/or at least received by the synthesized image generating device 20 via the signal paths 22 and 24. The synthesized image generating device 20 can additionally be connected to a central computing unit (not illustrated) of the arrangement 10 and/or to an interface for user inputs. In particular, the synthesized image generating device 20 can be configured to receive information about desired synthesized light patterns and/or synthesized images to be generated, or to read said information from a storage medium. In general, the synthesized image generating device 20 is configured to carry out the method explained below.

Figure 2:
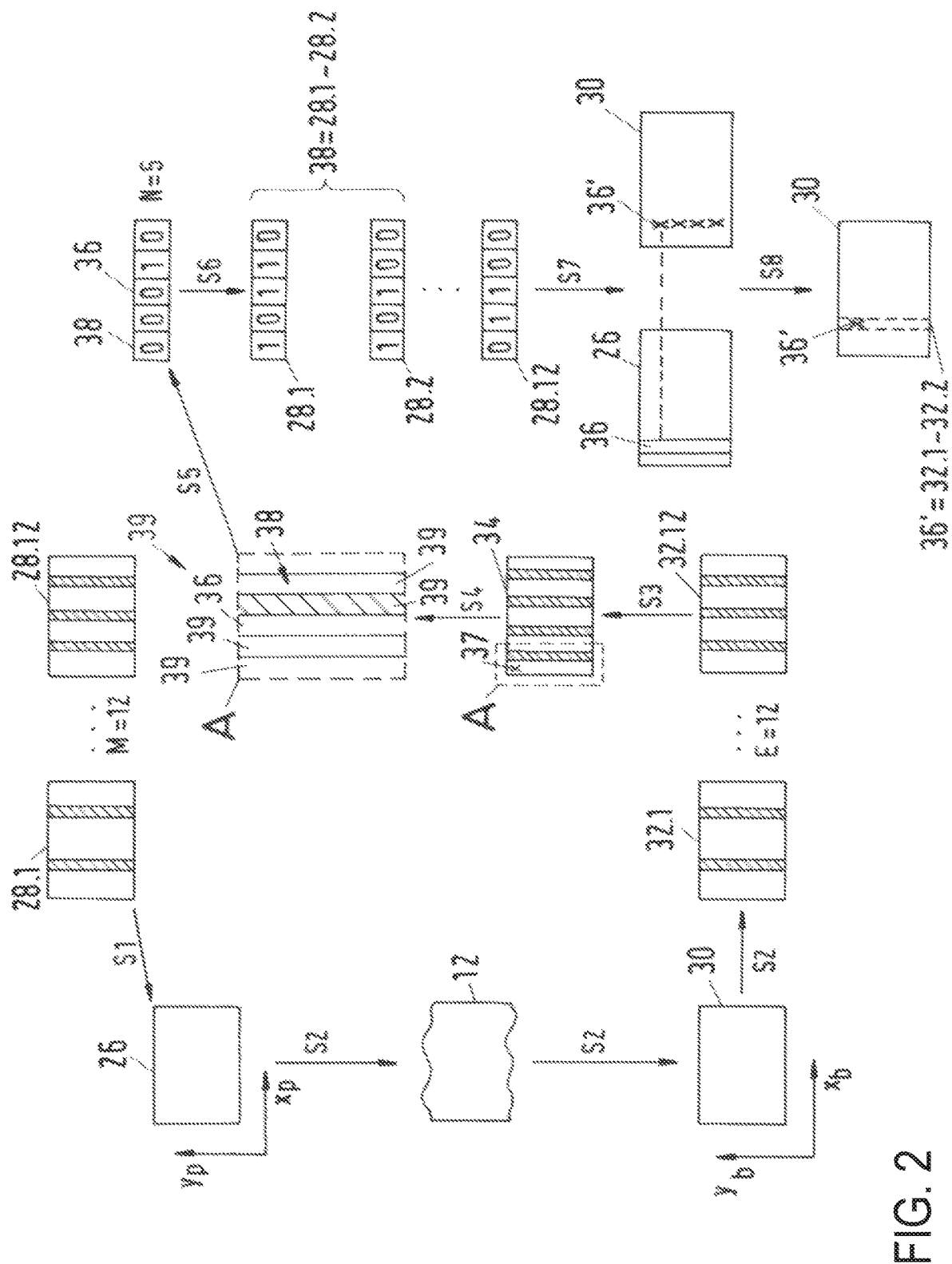
FIG. 2 shows an illustration for explaining the procedural principle of the method.
Figure 3:
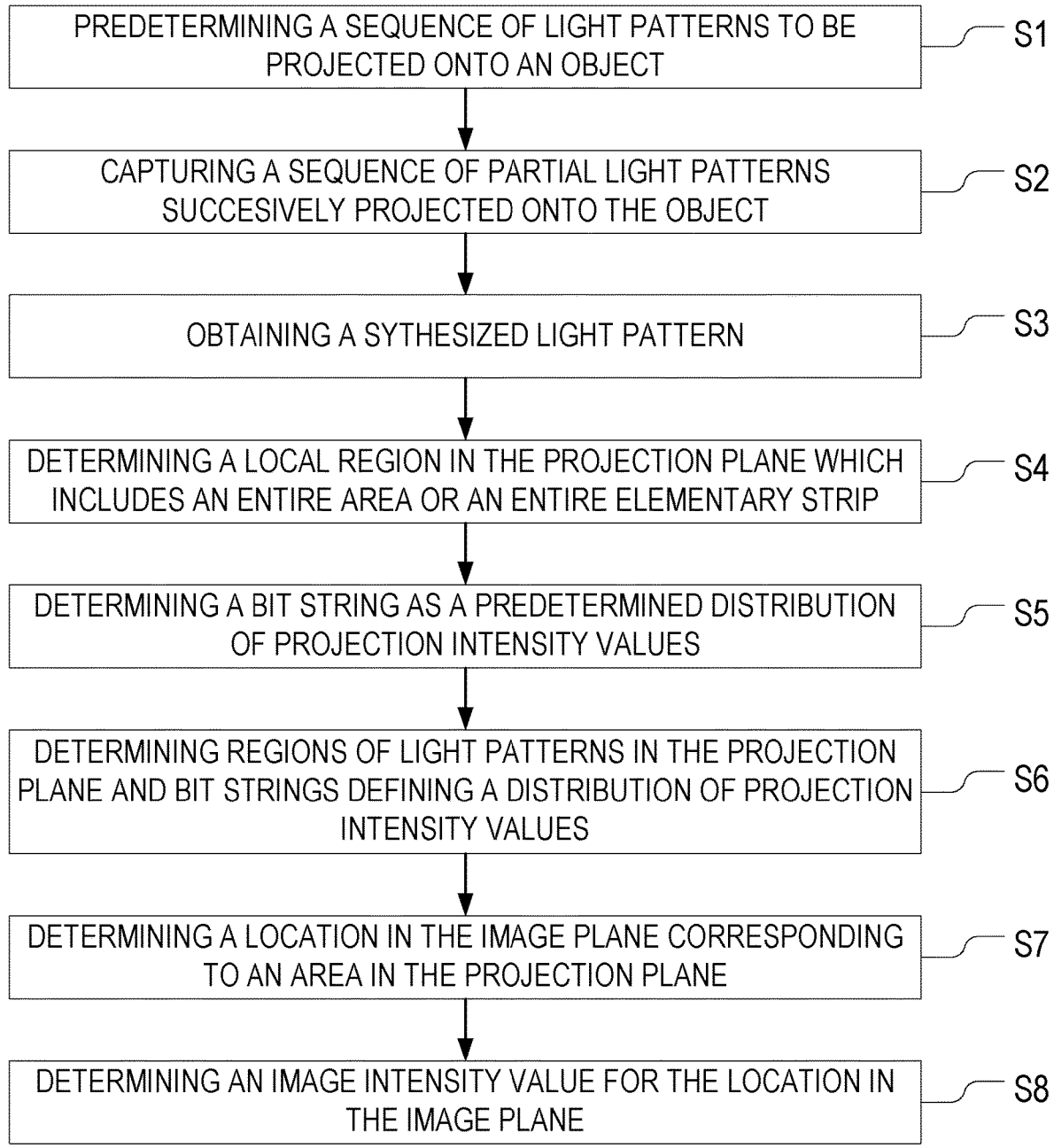
FIG. 3 shows a flowchart of the method.

Initially, the general principle of a method performed by the arrangement 10 of FIG. 1 is explained on the basis of FIGS. 2 and 3. FIG. 2 shows an illustration for explaining the general procedural principle, while FIG. 3 shows a flowchart of the method.

FIG. 2 shows an illustration of the light patterns 28.1 to 28.12 to be projected, with the number of these light patterns 28.1 to 28.12 being 12 in an exemplary fashion. Further, a two-dimensional projection plane 26 is shown, which, in the case of the digital projection device 16, is defined by the micromirror projection array of the latter and in which light patterns 28.1 to 28.12 to be generated are defined, for example in the form of image files. The projection plane 26 has two coordinate axes, specifically a horizontal coordinate axis $X_p$ and a vertical coordinate axis $Y_p$. Further, the projection plane 26 is subdivided into a projection intensity value matrix, which has strung together columns along the $X_p$ axis, said columns each extending along the $Y_p$ axis, and strung together lines along the $Y_p$ axis, said lines each extending along the $X_p$ axis. Each location within the projection plane 26 (or each entry in the projection intensity value matrix) corresponds to an individual projector pixel, the coordinates of which are uniquely defined by way of the corresponding line and column number, or an $X_p$ and $Y_p$ value, and one projection intensity value is respectively predeterminable therefor.

In a first method step S1, a plurality of light patterns 28.1 to 28.12, which are each defined in the projection plane 26, are predetermined and projected onto the object 12 as a light pattern sequence. The light patterns 28.1 to 28.12 are defined as binary stripe light patterns and include bright and dark regions (i.e., bright and dark stripes). The stripes extend vertically in the column direction of the position plane 26 and cover at least one single column in its entirety.

The resolution of the projection device 16 or of the projection plane 26 is chosen in such a way that a smallest projectable pattern element, which is referred to as an elementary stripe below, fills a single column (i.e., a column with a width of one projector pixel). The overall number of bright and dark elementary stripes that are projectable by a single light pattern 28 can be denoted K, where K also corresponds to the column number or sets the value range of the $X_p$ axis.

The projected binary stripe light patterns 28.1 to 28.12 can each be defined as a sequence of binary values, in particular as a sequence of bit values (i.e., values of 0 or 1). More precisely, for each position along the $X_p$ axis or for each elementary stripe, the bit string specifies whether it should be bright (0 bit) or dark (1 bit), wherein the setting of 0 and 1 as bright and dark may also be the other way around and is unimportant per se. When looking along the $X_p$ axis, this can set the positions at which bright or dark stripes should be projected, wherein bright and dark stripes with a defined width can be assembled or set by a plurality of identical successive binary values (e.g., a plurality of successive zeros or a plurality of successive ones). This bit string is stored in an image file belonging to a light pattern 28 and can be read for projection purposes. Reference should be made to the fact that the stripes of the light patterns 28.1 to 28.12 could also extend at an angle or horizontally within the projection plane 26 without this having an effect on the basic applicability of the method.

Further, the projected sequence of the light patterns 28.1 to 28.12 is Gray-encoded in the example. Further, the number of projected light patterns M is selected in such a way that $2^M \geq K$ applies in order to facilitate unique decoding. By way of example, a number of projected light patterns M is selected to be 12, with the number of projectable elementary stripes K (or, expressed differently, the number of individual pattern elements in a light pattern) corresponding to a value of 2000. Finally, a minimum run-length (MinRL) of ten and a maximum run-length (MaxRL) of sixteen are chosen as run-length properties for the light patterns 28 defined as a sequence of bit values. However, none of the aforementioned properties of the light pattern sequence are mandatory. In particular, the specified numerical values should be understood to be merely exemplary.

The sequence of the partial light patterns 28.1 to 28.12 is successively projected onto the object 12 in a step S2. A light pattern-specific object image 12 is captured for each light pattern 28 by the capture device 14 of FIG. 1. Each image is defined in a two-dimensional image plane 30. By way of example, the latter is defined by a capture array (e.g., a photodiode array) of a camera sensor of the capture device 14 and, in turn, has a coordinate system with a horizontal $X_b$ coordinate axis and a vertical $Y_b$ coordinate axis. The captured images, too, can be stored as image files defined in this coordinate system. Further, the image plane 30 is subdivided into an image intensity value matrix, which has strung together columns along the $X_b$ axis, said columns each extending along the $Y_b$ axis, and strung together lines along the $Y_b$ axis, said lines each extending along the $X_b$ axis. Each location within the image plane 30 (or each entry in the image intensity value matrix) corresponds here to an individual image pixel (or camera pixel), the coordinates of which are uniquely defined by way of the corresponding line and column number, or an $X_b$ and $Y_b$ value, and a single image intensity value is capturable therefor.

The number E of captured images 32 corresponds to the number of projected light patterns 28 in the shown case (i.e., 12), which is why the individual captured images are denoted by 32.1 to 32.12; however, not all of these are imaged in FIG. 2. It is also possible to capture more images 32.1 to 32.12 per projected light pattern 28.1 to 28.12 and, for example, it is possible to calculate a mean value or an average result image therefrom. Further, it is also possible to record a bright or dark image, by which the image intensities are subsequently modified. Further, contrary to the illustration of FIG. 2, it is understood that the individual stripes in the captured images 32 may be distorted in relation to the projected stripes in the light patterns 28.1 to 28.12 according to the stipulation by the surface form of the object 12.

A synthesized light pattern 34 (for example, as a consequence of a selection of a user in this respect and/or as a result of a readout of an associated image file from a storage device of the arrangement 10) is obtained in a step S3. This can be a light pattern that is predetermined by the user or automatically created; this light pattern deviates from the actually projected light patterns 28.1 to 28.12 and an object image is synthesized therefor from the actually captured images 32.1 to 32.12 rather than being captured by the capture device 14. Once again, the synthesized light pattern 34 is defined in the projection plane 26. In the shown example, an associated synthesized image intensity value (in the image plane 30) is generated for each location (i.e., for each projector pixel) in the projection plane 26 for the synthesized light pattern 34. Consequently, an overall synthesized image is generated, which is assembled from the individual synthesized image intensity values. In the manner explained below and only regenerated in abbreviated form here, a location 36' in the image plane can be used as a starting point for determining the synthesized image intensity values, a synthesized image intensity value intending to be determined for said location, an area 36 in the form of an elementary stripe of the synthesized light pattern 34 corresponding to the location 36' (i.e., at least proportionately imaged on the latter) can be determined and a linear combination for assembling image intensity values at the location 36' is determined for this area. Alternatively, areas 36 in the form of an elementary stripe of a synthesized light pattern 34 can be used as a starting point and image locations 36' corresponding thereto can be determined, image intensity values then being determined therefor on the basis of analogous linear combinations. Each of the aforementioned variants is repeated until associated synthesized image intensity values are determined for each location in the image plane 30. Mixed forms of the aforementioned approaches are also conceivable (e.g., image intensity values are determined according to one of the variants for some image locations and according to another variant for other image locations).

In exemplary fashion, a location 37, labeled by appropriate $X_p$ and $Y_p$ coordinates in the projection plane 26, is marked for the synthesized light pattern 34 in FIG. 2. This location 37 is located in an elementary stripe of the projection plane 26, said elementary stripe extending vertically in the figures. This elementary stripe forms an individual area 36 in the projection plane 26 containing a plurality of locations 37 (or projector pixels) of the projection plane 26, said locations being strung together in accordance with the column direction. A linear combination for assembling a local projection intensity value distribution and image locations 36' in the image plane 30, onto which are imaged locations within an area 36, can be determined for each such area 36 or each such elementary stripe in the manner explained below. As explained, areas of the projection plane 26 that are not capturable with an image and therefore do not have corresponding image locations may also exist in theory. These areas may be disregarded within the scope of the method presented here.

In a step S4, a local region 38 in the projection plane 26 is determined which includes the entire area 36 or an entire elementary stripe. This region 38 is schematically shown in a magnified section A of the synthesized light pattern 34 in FIG. 2.

It is possible to identify that the local region 38 extends in the line direction, i.e., along the $X_p$ axis. Since stripe patterns whose pattern elements (or elementary stripes) always cover an entire column of the projection plane 26 are considered in the shown case, the local region 38, as mentioned, is also defined in column-shaped fashion (i.e., it extends along one or more entire columns or along the entire $Y_p$ axis) and it includes the area 36.

When considered in the line direction, the size of the local region 38 is set on the basis of an effective width of a projected elementary stripe in the image plane 30. Expressed differently, the image locations (or image pixels) and/or areas in the image plane 30 for which changeable image intensity values can be determined when projecting a (typically single and bright) elementary stripe as smallest projectable pattern element is determined (for example in advance, i.e., before performing step S1). These image locations and/or areas, which are typically located in the vicinity or neighborhood (particularly transversely to the elementary stripe direction) of that image location on which the elementary stripe is in fact projected, may define a necessary size of the local region 38 (particularly transversely to the elementary stripe direction) in the projection plane 26. In general, the size of the local region 38 can be uniform within the projection plane 26 (i.e., the same size can apply to each local region 38). Within the scope of the present disclosure, the local region 38 can also be referred to as a neighborhood. The area 36/the elementary stripe including the location 37 is typically arranged centrally in, or in the middle of, the local region 38.

In the exemplary embodiment shown in FIG. 2, the local region 38 includes five individual elementary stripes 39 in the projection plane 26, together with associated projection intensity values, for example in the form of the bit string (0; 0; 0; 1; 0), with the area 36 including the location 37 considered above corresponding to the third 0 bit from the left (see also the bit string in step S5). Consequently, the local region 38 or the neighborhood has a size N of five.

Consequently, two further elementary stripes 39 with corresponding bit values (0; 0 and 1; 0) are arranged in the local region 38 on both sides of the area 36 on account of the central positioning of the area 36. However, a neighborhood with a size N of, e.g., seven could likewise be considered. In the shown example, this includes, e.g., the bit string (0; 0; 0; 0; 1; 0; 0) with the central 0 bit as considered area 36.

For the shown example of stripe light patterns, in which the individual stripes extend over the entire projection plane 26 along a predetermined axis (for example, the $Y_p$ axis or in the column direction), a location 37 in the projection plane 26 can be considered to be fixed merely along one coordinate axis, specifically along the axis $X_p$ extending perpendicular to the stripe direction, at least for the ascertainment of a linear combination as explained below. This is due to the fact that the same bit value applies to all locations in the projection plane 26 that have the same column position or $X_p$ coordinate. Expressed differently, locations with the same column position or $X_p$ coordinate lie in the same elementary stripe of the projection plane 26, and so a linear combination as determined below, which is determined for the area 36, likewise applies to these locations. In the present example, this is used to reduce the number of necessary calculation operations and consequently shorten the calculation time. Thus, in particular, the linear combinations explained below are determined for each elementary stripe or in relation to an individual column position or $X_p$ coordinate and said linear combinations apply to all locations 37 within a single elementary stripe.

In a step S5, the bit string is determined as a predetermined distribution of projection intensity values (see the exemplary bit string at step S5 in FIG. 2) in the local region 38 including the area 36.

Thereupon, in a step S6, regions of the light patterns 28.1 to 28.12 in the projection plane 26 and the bit strings (each defining a distribution of projection intensity values), are determined, which correspond to the local region 38, respectively. In FIG. 2, these are shown for the selected light patterns 28.1, 28.2, and 28.12 in step S6.

Subsequently, it is determined which of the bit strings of the individual light patterns 28.1 to 28.12 need to be linearly combined with one another in what way in order to obtain the bit string of the local region 38 of the synthesized light pattern 34. It is possible to recognize that this succeeds, for example, by subtracting the bit string of the second light pattern 28.2 from the first light pattern 28.1. In other words, the bit string in the local region 38 of the synthesized light pattern 34 corresponds to the difference of the light patterns 28.1 and 28.2 in their respectively corresponding regions in the projection plane 28. In FIG. 2, this is expressed in simplified fashion by specifying the relationship 38=28.1 to 28.2.

As a result, the linear combination of the actually projected light patterns 28.1 to 28.12, with which an actually desired projection intensity value distribution of the (non-projected) synthesized light pattern 34 can be achieved in the local region 38, is thus determined in step S6.

In step S7, which could also be performed at a different time and, in particular, immediately after step S2, a location 36' (image location) in the image plane 30, corresponding to the area 36 of the projection plane 26, is thereupon determined or such an image location 36' is obtained. As explained below, the sequence and, in particular, the question whether the starting point is the area 36 or the image location 36' are not decisive.

In this case, a correspondence denotes the relationship that a location in the projection plane 26 (e.g., a projector pixel) lying in the area 36 is imaged on the image location 36' or, conversely, that a radiation intensity emitted by a projector pixel in the area 36 is captured at the image location 36'. As mentioned, an exact determination to the effect of which locations of the area 36 are imaged on which image locations 36' is not necessary. Instead, it may suffice to determine the image locations 36' that correspond to an area 36.

More precisely, a not necessarily contiguous corresponding area in the image plane 30 can be obtained for an individual area 36 or an elementary stripe on account of the distortions of the projected light patterns 28.1 to 28.12 generated by the object 12 (i.e., an individual projected elementary stripe can be projected onto a plurality of not necessarily contiguous and/or stripe-shaped corresponding image locations 36'). This relationship within the meaning of an assignment of a set of image locations 36' to a single area 36 or a single elementary stripe can be determined within the scope of determining the correspondence.

Consequently, a correspondence is determined to the effect of the locations in the image plane 30 on which a single elementary stripe of the projection plane 26 is imaged or, expressed differently, an elementary stripe-based solution of the correspondence problem. Proceeding from an image location 36' for which an image intensity value is intended to be synthesized, the elementary stripe or area 36 to which this image location 36' corresponds can also be determined, deviating from the sequence explained above, and the linear combination for this elementary stripe can be used as explained below in order to determine the image intensity value.

The projected sequence of light patterns 28.1 to 28.12 can be evaluated for the purposes of determining the correspondences. In the shown case, the correspondence is found by virtue of the fact that the sequence of light patterns 28.1 to 28.12 is Gray-encoded and the captured images 32.1 to 32.12 can consequently be decoded in a manner known per se in order to determine which area 36 or which elementary stripe in the projection plane 26 is imaged on which locations in the image plane 30 for the given measurement scene. To this end, the coordinates of the area 36, for example, are considered in the $X_p$-$Y_p$ coordinate system and the complete coordinates of the image location 36' corresponding thereto are also determined in the $X_b$-$Y_b$ coordinate system.

Determining the correspondences in step S7 can also be carried out, so to speak, in one iteration for all individual areas 36 of the projection plane 26, said areas each being able to include an elementary stripe including the associated plurality of individual locations in the projection plane 26. Consequently, the elementary stripe in the projection plane 26 to which a location in the image plane 30 corresponds can be determined for each location. In particular, this can be implemented directly after the image capture, i.e., after step S2. A result of step S7 can also be that there are no corresponding image locations for certain areas 36 of the projection plane 26 as these areas 36 (or the reflected radiation traced back thereto) lie outside of a capturable image region.

Finally, an image intensity value is determined for the image location 36' in step S8. The image intensity value is also referred to as the synthesized image intensity value, because the latter is not captured by the capture device 14 but generated or synthesized purely by calculation. The linear combination of the light patterns 28.1 to 28.12 determined in conjunction with step S6 is used to generate the distribution of the projection intensity values in the local region 38 of the synthesized light pattern 34.

As indicated in FIG. 2 for step S8, the synthesized image intensity value is likewise determined on the basis of the same linear combination, with, however, the light patterns 28.1 to 28.12 or the projection intensity values thereof being replaced by the images 32.1 to 32.12 captured for these light patterns 28.1-28.12 and, more precisely, by the image intensity values respectively captured at the corresponding image location 36'.

Consequently, the synthesized image intensity value is determined by forming the difference of the image intensity values of the first and the second captured images 32.1 and 32.2 at the corresponding image location 36' of the image plane 30, in a manner analogous to the linear combination in step S6. In FIG. 2, this is expressed in simplified fashion for step S8 as 36'=32.1 to 32.2.

Rather than combining the actually captured image intensity values according to the linear combination, it is also possible to combine modified image intensity values in accordance with the linear combination. Expressed differently, the image intensity values actually combined according to the linear combination can merely be based on the image intensity values present at the considered image location 36' but cannot be identical thereto. By way of example, the actual image intensity values obtained from a linear combination can be modified in such a way that a dark and/or bright image subtraction, explained in general terms above, is implemented on the captured image intensity values, as a result of which modified image intensity values, combinable by linear combination, are obtained. The aforementioned is tantamount to the linear combination of the image intensity values having the linear combination of the production intensity values (or having these in a modified version as a consequence of the value replacement), but also comprising additional expressions in order to modify the image intensity values as described (i.e., in order, for example, to be able to subtract a minimum intensity value therefrom in each case).

It is understood that steps S4 to S8 can also be repeated as often as desired, in particular until a synthesized image intensity value was generated for all image locations 36' corresponding to this area 36, and hence a complete synthesized image was generated, for each area 36 (or at least for each area capturable in the image) and consequently for each elementary stripe (or at least for each elementary stripe capturable in the image) of the synthesized light pattern 34. Additionally, a plurality of synthesized images can be created for a plurality of different synthesized light patterns 34 such that, for example, it is also possible to generate synthesized images that would be capturable with a predetermined (e.g., Gray-encoded) sequence of synthesized light patterns 34.

The synthesized images (in particular a possible plurality thereof) may generally be evaluated in a manner analogous to actually captured images in order to determine depth information items or else complete three-dimensional coordinates for the object 12.

As mentioned, the same procedural principle yielding the same result could also be carried out with a slightly modified sequence. Thus, in principle, there is the option of proceeding from individual areas 36 of a synthesized light pattern 34 in the manner described above, in this respect respectively determining corresponding image locations 36' and linear combinations for a local region 38 containing a respective area 36 and determining image intensity values by precisely this linear combination for all corresponding image locations 36'. It is consequently possible to obtain a complete synthesized image if this is carried out for all areas 36 (or at least all areas capturable in the image) of a synthesized light pattern 34.

However, deviating from the sequence explained above, the linear combination can also be determined in advance (i.e., for example, before determining synthesized image intensity values) for all areas 36 or elementary stripes of the synthesized light pattern 34. Likewise, correspondences between areas 36 and, in particular, each area 36 and individual image locations 36' can be determined in advance (i.e., for example, before determining synthesized image intensity values). Then, these information items can be stored in a memory device, for example, and can be recallable when required.

Below, the mathematical background for determining the linear combinations in step S6 is explained first, followed by an example for producing a plurality of synthesized images for a synthesized light pattern sequence.

As explained, the synthesized light pattern 34 (but also projected light patterns 28.1 to 28.12) may include k=1 K elementary stripes along the $X_p$ axis in the case of stripe patterns, said elementary stripes each defining an individual area 36 and each extending in the $Y_p$ direction. In order to obtain the linear combination x for generating the projection intensity value distributions, desired according to a synthesized light pattern 34, in a local region 38 for each elementary stripe k (and hence for each area 36), the following system of equations (1) is solved:

$$A*x=b \qquad (1).$$

Here, the matrix A is generally an N×M matrix, where N corresponds to the size (or else bit value number) of the local region 38 and M corresponds to the number of captured light patterns. In the matrix A, the projection intensity value distributions of the projected light patterns 28.1 to 28.12 are subsumed in regions of the projection plane 26 corresponding to the considered local region 38. Here, the corresponding regions can be defined by the same elementary stripe within the projection plane 26. As a result, the content of the matrix A corresponds to the combination of the bit strings according to step S6 of FIG. 2.

The bit strings determined for each light pattern as described above are referred to as N-neighborhood below. Consequently, the following applies:

$A^T$=[N-neighborhood for elementary stripe k in the first light pattern 28.1, N-neighborhood for elementary stripe k in the second light pattern 28.2, ( . . . ) N-neighborhood for elementary stripe k in the twelfth light pattern 28.12].

Further, the following applies to b of the system of equations (1):

$b^T$=[N-neighborhood for elementary stripe k of the synthesized light pattern 34].

The system of equations (1) need not have a unique solution since only individual neighborhoods or local regions 38 of the synthesized light pattern 34 are intended to be synthesized by linear combination x. By contrast, regions lying outside of the neighborhood are unimportant, and so a plurality of possible linear combinations for the solution of the system of equations (1) may exist. This linear combination can then be used as explained above to determine the desired synthesized image intensity values.

In the aforementioned equations, too, it is possible to consider only those elementary stripes k that are even capturable in the image because they lie within a capture region of an employed capture device.

An example in which six synthesized images are generated for a desired synthesized light pattern sequence is explained below. The synthesized light pattern sequence, whose six individual synthesized light patterns 34 are known and present as image files, for example, is selected here as a so-called 6 phase shift. Consequently, provision is made for a successive shift of stripes of defined width (i.e., including a predetermined number of elementary stripes) within the projection plane 26 to be obtained, which, when considered over the totality of the synthesized light patterns 34, takes place orthogonal to the stripe direction (i.e., along the $X_p$ axis).

Here, stripe patterns are considered, in which a single projection intensity value is predetermined for an individual elementary stripe (i.e., the same projection intensity value applies to each location within the elementary stripe or in a column).

Here, local regions 38 including a bit string of size N=7 can be considered for the six synthesized light patterns 34 of the synthesized light pattern sequence, which local regions repeat in a respective synthesized light pattern 34 after six interposed elementary stripes. By way of example, the overall number of elementary stripes K of each synthesized light pattern 34 can be 2000. In detail, the following applies for the case of six binary stripe patterns, wherein a line regenerates the repeating local regions 38 (or N=7-neighborhoods) of a single synthesized light pattern 34 and the columns each relate to the same elementary stripe and consequently also relate to the same $X_p$ position in the projection plane 26:

```
1 1 1 0 0 0 1
0 1 1 1 0 0 0
0 0 1 1 1 0 0
0 0 0 1 1 1 0
1 0 0 0 1 1 1
1 1 0 0 0 1 1
```

A displaced stripe considered over the entire synthesized light patterns 34 (phase shift) is expressed by the diagonal distribution of the ones in the matrix above.

In the same way, the synthesized light patterns 34 may also, however, be defined as grayscale value-based stripe patterns. By way of example, the following projection intensity value distribution comes into question here for the desired phase shift and, once again, in relation to repeating local regions 38 (or N=7-neighborhoods) of the respective synthesized light patterns 34, wherein a line once again relates to an individual synthesized light pattern 34:

```
0.5000  0.9330  0.9330  0.5000  0.0670  0.0670  0.5000
0.0670  0.5000  0.9330  0.9330  0.5000  0.0670  0.0670
0.0670  0.0670  0.5000  0.9330  0.9330  0.5000  0.0670
0.5000  0.0670  0.0670  0.5000  0.9330  0.9330  0.5000
0.9330  0.5000  0.0670  0.0670  0.5000  0.9330  0.9330
0.9330  0.9330  0.5000  0.0670  0.0670  0.5000  0.9330
```

Thereupon, the linear combination can be determined from the projection intensity values of the actually projected light patterns 28.1 to 28.12, by which the corresponding neighborhoods can be generated, for each of the desired neighborhoods of the synthesized light patterns 34 (i.e., for each line in the matrices above).

To this end, a currently observed area 36 or elementary stripe k of the projection plane 26 is determined and the specific local region 38 (N=7) is formed therefor from the projection intensity value distributions, regenerated above, which repeat over the entire elementary stripes k. In relation to the grayscale value example above and on the basis of the assumption that the latter relates to the elementary stripes k=1 . . . 7, and in view of the explained intensity value repetitions over the totality of elementary stripes, the formed local region 38 for the sixth elementary stripe (k=6 with a value of 0.0670) of the first synthesized light pattern 34 is as follows:

0.9330 0.5000 0.0670 0.0670 0.5000 0.5000 0.9330

Thereupon, the projection intensity value distributions can be determined for corresponding regions or neighborhoods of the individual projected stripe light patterns 28.1 to 28.12 in the projection plane 26 and these can be combined to form the matrix A as described above.

By way of example, the following values are obtained for matrix A of the system of equations (1) for twelve projected binary stripe light patterns 28.1 to 28.12 in accordance with the notation above:

```
1 1 1 0 1 1 0 0 0 1 1 1
0 1 1 0 1 1 0 0 0 1 1 1
0 1 1 0 0 1 0 0 0 1 1 1
0 1 1 0 0 1 0 1 0 1 1 1
0 1 1 0 0 1 0 1 0 1 0 1
0 1 1 1 0 1 0 1 0 1 0 1
0 0 1 1 0 1 0 1 0 1 0 1
```

The vector b of the system of equations (1) then corresponds to a respective line from the projection intensity value distributions of the synthesized light patterns 34 regenerated above. Consequently, the following applies to the first (i.e., regenerated in the first line) grayscale value-based synthesized light pattern 34:

0.9330
0.9330
0.5000
0.0670
0.0670
0.5000

Subsequently, the system of equations (1) can be solved to obtain the sought after linear combination x and the image intensity values obtained for the projected stripe light patterns 28.1 to 28.12 (in addition to an optional bright and/or dark image subtraction) can, on the basis thereof, likewise be subjected to linear combination according to step S8.

Here, it should be observed that there is no unique solution to the system of equations (1) on account of the zero column in matrix A above. In order nevertheless to arrive at a solution, all redundant columns of A can be removed and the matrix A consequently can have an inverted design, whereupon a unique linear combination x can be obtained by solving the system of equations (1).

Figure 4:
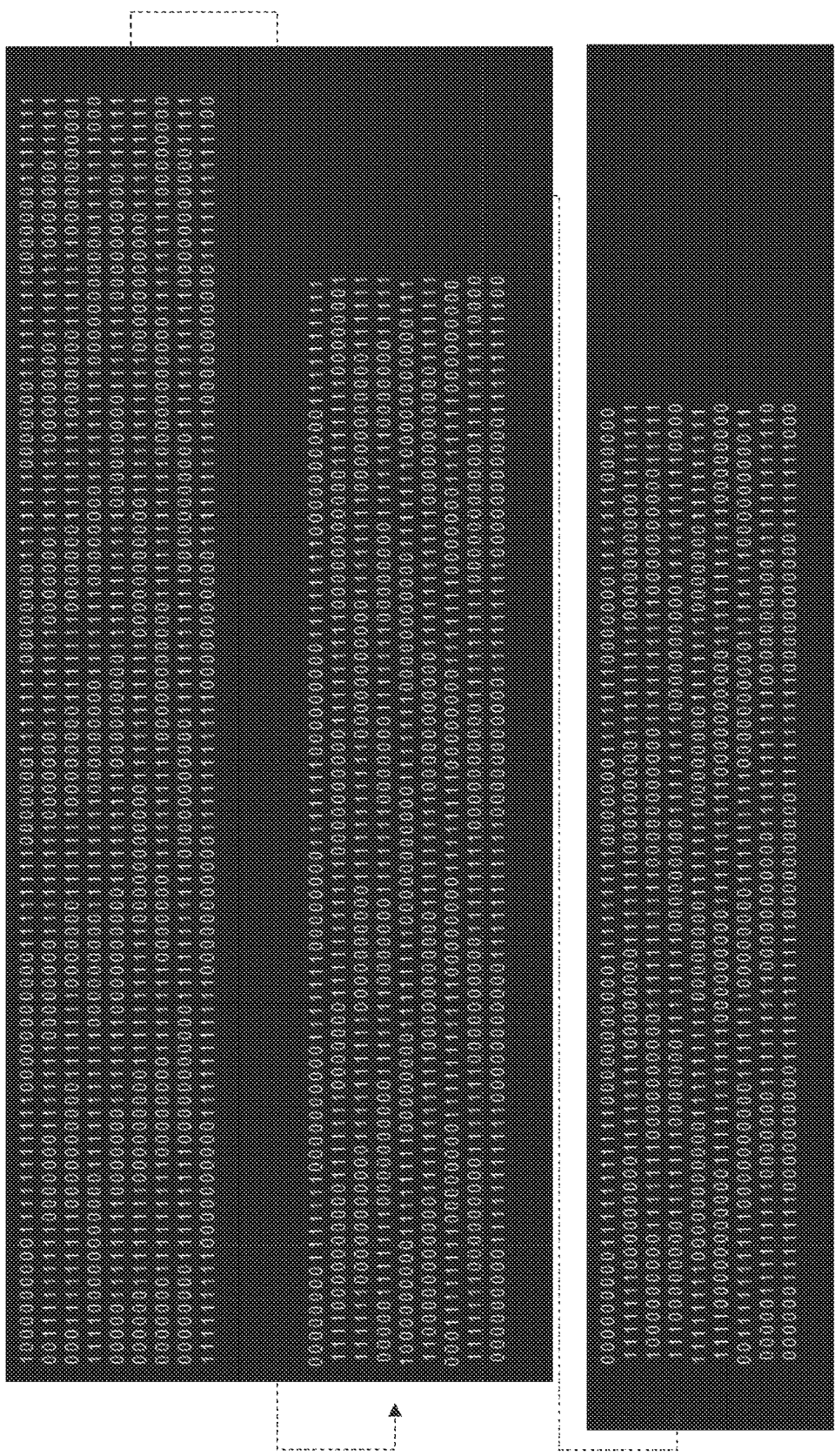
FIG. 4 shows an example of a projected light pattern sequence.

FIG. 4 shows an example of a projected light pattern sequence, from which it is possible to synthesize synthesized light patterns 24 (or local regions 38) with any projection intensity value distribution. In this case, a size of the local region 38 of a synthesized light pattern 34, for which any projection intensity value distribution can be synthesized by linear combination with this light pattern sequence, is selected to be N=7 (i.e., it includes seven bit values).

Once again, the light pattern sequence is represented by a matrix, with each line specifying a projected light pattern and, more precisely, a stripe arrangement specified as a bit string (0=bright, 1=dark) of a single projected light pattern. On account of the format of the sheet, the lines are not regenerated continuously but represented in interrupted fashion. More specifically, FIG. 4 shows three individual blocks, which, however, each relate to the same matrix and which can be composed or strung together to form nine complete lines. Here, the top block forms the start, which should be followed by the central block and subsequently the lower block and these are strung together.

It is possible to recognize that the light pattern sequence includes nine individual lines and consequently nine individual patterns (M=9), for which, accordingly, nine different (i.e., light pattern-specific) images can be captured. Here, seven is selected as minimum run-length and eleven is selected as maximum run-length. The Gray-encoding property is satisfied (see, for example, the first two columns, which only differ in respect of the uppermost bit, or else the second and third column, which differ in respect of the second bit). The bit string in a column represents a sequence of bit values that are received in an area of the image plane corresponding thereto (i.e., to this elementary stripe). This sequence can also be referred to as a codeword. In total, there are 256 columns or elementary stripes and consequently also 256 codewords, which are included in the light pattern sequence.

It is understood that the foregoing description is that of the exemplary embodiments of the disclosure and that various changes and modifications may be made thereto without departing from the spirit and scope of the disclosure as defined in the appended claims.

What is claimed is:

1. A method for optically capturing an object with a light pattern projection, the method comprising:
projecting a predetermined plurality of light patterns onto the object, each of the predetermined plurality of light patterns including location dependent projection intensity values in a projection plane;
capturing, with a capturing device, at least one image of the object when each of a respective light pattern is projected onto the object to obtain position location dependent image intensity values for the respective light pattern in an image plane, such that a plurality of images is captured overall;
determining a first linear combination of the predetermined plurality of light patterns, which yields a predetermined distribution of the projection intensity values in a local region of the projection plane, the local region including an area of the projection plane including at least one location; and
generating a synthesized image intensity value for at least one image location in the image plane which corresponds to the area of the projection plane of the local region, the synthesized image intensity value at the at least one image location not being captured by the capturing device but being determined by calculation and specifically by a second linear combination of the image intensity values of several different captured images of the predetermined plurality of light patterns, the projection intensity values of which forming the first linear combination of the predetermined plurality of light patterns for the local region, the second linear combination of the image intensity values being based on the first linear combination for the local region, but with the projection intensity values being replaced by the image intensity values at the at least one image location.

2. The method as claimed in claim 1, wherein the light patterns have projection intensity values which permit any distribution of the projection intensity values to be generated therefrom in each local region of the projection plane by the first linear combination.

3. The method as claimed in claim 1, further comprising:
determining depth information for the object based on the synthesized image intensity value.

4. The method as claimed in claim 1, further comprising:
selecting a size of the local region of the projection plane depending on the size of an area in the image plane, within which varying image intensity values are determinable when projecting a predetermined pattern element.

5. The method as claimed in claim 4, wherein the predetermined pattern element is a pattern element with smallest projectable dimensions at least along one dimension of the projection plane.

6. The method as claimed in claim 1, further comprising:
generating at least one synthesized image based on a plurality of generated synthesized image intensity values.

7. The method as claimed in claim 6, further comprising:
generating a plurality of synthesized images, the plurality of synthesized images being assembled to form a synthesized image sequence which belongs to a predetermined synthesized light pattern sequence.

8. The method as claimed in claim 7, wherein the predetermined synthesized light pattern sequence is Gray-encoded and/or has a phase shift.

9. The method as claimed in claim 7, wherein the plurality of synthesized images is generated and a number of synthesized images is larger than or equal to a number of the light patterns.

10. The method as claimed in claim 1, wherein the light patterns at least one of:
form a Gray-encoded light pattern sequence; or
have predetermined run-length properties.

11. The method as claimed in claim 1, wherein a number M of projected light patterns is selected depending on a maximum possible number K of pattern elements in the light pattern, such that $2M \geq K$.

12. The method as claimed in claim 1, further comprising:
projecting same light patterns for measuring objects with different geometric properties.

13. The method as claimed in claim 1, further comprising:
subtracting a minimum intensity value from the image intensity values of the light patterns at the at least one image location, and/or
subtracting the image intensity values from a maximum intensity value to generate the synthesized image intensity value.

14. An arrangement for optically capturing an object with a light pattern projection, the arrangement comprising:
a projection device including a projection plane and being configured to project a predetermined plurality of light patterns onto the object, each of the predetermined plurality of light patterns including location dependent projection intensity values in the projection plane;
a capture device configured to capture at least one image of the object when each of a respective light pattern is projected onto the object to obtain location dependent image intensity values for the respective light pattern in an image plane, such that a plurality of images is captured overall; and
a synthesized image generating device configured to:
determining a first linear combination of the predetermined plurality of light patterns, which yields a predetermined distribution of projection intensity values in a local region of the projection plane, the local region including an area of the projection plane including at least one location; and
generating a synthesized image intensity value for at least one image location in the image plane which corresponds to the area of the projection plane of the local region, the synthesized image intensity value at the at least one image location not being captured by the capturing device but being determined by calculation and specifically by a second linear combination of the image intensity values of several different captured images of the predetermined plurality of light patterns, the projection intensity values of which forming the first linear combination of the predetermined plurality of light patterns for the local region, the second linear combination of the image intensity values being based on the first linear combination for the local region, and but with the projection intensity values being replaced by the image intensity values at the at least one image location.

* * * * *